(12) United States Patent
Abu-Rejailah et al.

(10) Patent No.: US 11,580,610 B2
(45) Date of Patent: Feb. 14, 2023

(54) SYSTEMS AND METHODS FOR MONITORING AND CONTROLLING ELECTRICAL POWER CONSUMPTION

(71) Applicant: Saudi Arabian Oil Company, Dhahran (SA)

(72) Inventors: Adel Abu-Rejailah, Dammam (SA); Mohammed A. Batouq, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 146 days.

(21) Appl. No.: 17/141,863

(22) Filed: Jan. 5, 2021

(65) Prior Publication Data
US 2022/0215484 A1 Jul. 7, 2022

(51) Int. Cl.
G06Q 50/06 (2012.01)
G06Q 10/04 (2023.01)
G05B 15/02 (2006.01)

(52) U.S. Cl.
CPC .............. *G06Q 50/06* (2013.01); *G05B 15/02* (2013.01); *G06Q 10/04* (2013.01)

(58) Field of Classification Search
CPC .......... G05B 15/02; G05F 1/66; G06Q 10/04; G06Q 50/06
See application file for complete search history.

(56) References Cited

U.S. PATENT DOCUMENTS

| | | | | |
|---|---|---|---|---|
| 4,090,062 A * | 5/1978 | Phillips | ................... | H02J 3/14 |
| | | | | 219/486 |
| 7,793,126 B2 * | 9/2010 | McGrane | ................ | G06F 1/26 |
| | | | | 713/323 |
| 7,870,750 B2 * | 1/2011 | Yoon | ........................ | F24F 11/62 |
| | | | | 62/175 |
| 7,996,690 B2 * | 8/2011 | Shetty | ................... | G06F 1/3287 |
| | | | | 713/340 |
| 8,581,439 B1 * | 11/2013 | Clayton | ................... | H02J 9/00 |
| | | | | 307/64 |

(Continued)

FOREIGN PATENT DOCUMENTS

CA 1162981 2/1984

OTHER PUBLICATIONS

Bin Abdullah et al., "Automation of Residential Electricity Cut off Using Network Based Embedded Controller," 2012 International Conference on Computer and Information Science (ICCIS), 5 pages.

(Continued)

*Primary Examiner* — Crystal J Barnes-Bullock
(74) *Attorney, Agent, or Firm* — Fish & Richardson P.C.

(57) ABSTRACT

A power management system obtains first data regarding several groups of electrical devices, including a budget and a respective priority metric associated with each of the groups. The system allots a respective amount of electrical power for use by each of the groups based on the first data. Further, the system obtains second data regarding the groups, including a respective amount of electrical power consumed by each of the groups. The system determines that a first group has consumed a first amount of electrical power that is greater than or equal to a second amount of electrical power that had been allotted for use by the first group. In response, the system re-allots at least a portion of a third amount of electrical power that had been allotted for use by a second group for use by the first group instead.

21 Claims, 8 Drawing Sheets

(56) References Cited

U.S. PATENT DOCUMENTS

| | | | | |
|---|---|---|---|---|
| 8,825,247 | B2* | 9/2014 | Kim | H02J 7/00047 |
| | | | | 903/903 |
| 8,843,772 | B2* | 9/2014 | Hormuth | G06F 11/3006 |
| | | | | 713/340 |
| 9,201,486 | B2* | 12/2015 | Jagadishprasad | G06F 9/5094 |
| 9,236,741 | B2* | 1/2016 | Jang | G06Q 10/063 |
| 9,256,263 | B1* | 2/2016 | Narayanan | G06F 1/3243 |
| 9,568,988 | B1* | 2/2017 | Narayanan | G06F 1/30 |
| 9,575,472 | B1* | 2/2017 | Clayton | G05B 11/01 |
| 9,588,506 | B1* | 3/2017 | Clayton | H04B 7/145 |
| 9,864,391 | B2* | 1/2018 | Lu | H04L 67/10 |
| 9,979,195 | B2* | 5/2018 | Djan-Sampson | H02J 3/28 |
| 10,126,723 | B2* | 11/2018 | Djan-Sampson | G05B 19/041 |
| 10,150,380 | B2* | 12/2018 | Vaughan | H02J 7/0013 |
| 10,345,888 | B2* | 7/2019 | Allen-Ware | G06F 1/3287 |
| 10,423,204 | B2* | 9/2019 | Allen-Ware | G06F 1/324 |
| 10,868,425 | B1* | 12/2020 | Porter | H02J 3/32 |
| 10,958,074 | B2* | 3/2021 | Berkowitz | H02J 3/1807 |
| 11,057,727 | B2* | 7/2021 | Zhao | G06F 1/325 |
| 2007/0203860 | A1 | 8/2007 | Golden et al. | |
| 2011/0289329 | A1* | 11/2011 | Bose | G06F 1/329 |
| | | | | 713/320 |
| 2015/0066609 | A1* | 3/2015 | Steele | G06Q 30/0207 |
| | | | | 705/14.1 |
| 2017/0192483 | A1* | 7/2017 | Boss | H02J 13/00016 |
| 2019/0075166 | A1* | 3/2019 | Gandhi | H04L 41/0816 |
| 2019/0199130 | A1* | 6/2019 | Minezawa | H05B 6/06 |
| 2020/0076191 | A1 | 3/2020 | Zaharchuk et al. | |
| 2020/0133367 | A1* | 4/2020 | Wang | H03M 13/6588 |
| 2020/0220353 | A1* | 7/2020 | Lyren | G06Q 50/06 |
| 2022/0186962 | A1* | 6/2022 | Turney | F24F 11/47 |

OTHER PUBLICATIONS

Sakthivel "Design of Automatic Power Consumption Control System Using Smart Grid—A Review," World Conference on Futuristic Trends in Research and Innovation for Social Welfare (WCFTR'16), 2016, 4 pages.

Sechilariu, "Intelligent Energy Management of Electrical Power Systems," Applied Sciences, Apr. 2020, 4 pages.

Soares et al., "A Residential Energy Management System," Apr. 2015, Springer-Verlag Berline Heidelberg, 5 pages.

Wang et al., "Load characteristics of electric vehicles in charging and discharging states and impacts on distribution systems," International Conference on Sustainable Power Generation and Supply (SUPERGEN 2012), Sep. 8-9, 2012, 7 pages.

* cited by examiner

SYSTEMS AND METHODS FOR MONITORING AND CONTROLLING ELECTRICAL POWER CONSUMPTION

TECHNICAL FIELD

The disclosure relates to systems and methods for controlling the distribution of electrical power to electrical devices in a facility.

BACKGROUND

A facility can include one or more devices that consume electrical power. For example, a facility can include one or more lighting systems, appliances, industrial equipment, computer systems, telecommunications systems, and/or other electrical devices.

Further, electrical power can be provided to the facility by a source of electrical power, such as a public utility or a private utility via an electrical grid. In some implementations, the source of electrical power can provide electrical power in exchange for a monetary fee.

SUMMARY

This disclosure describes systems and methods for controlling the distribution of electrical power to electrical devices in a facility. In an example implementation, a power management system can allot electrical power to each of several electrical devices in a facility, and monitor the consumption of electrical power by the electrical devices over time. In some implementations, the power management system can allot electrical power to the electrical devices based on one or more factors, such as the groupings of electrical devices in the facility, the relative importance of each group, and a budget associated with each group or with the facility as a whole. In some implementations, the power management system can selectively re-allot electrical power from one group to another or selectively instruct certain electrical devices to shut off, such that the cost of electrical power does not exceed a particular budget.

The implementations described in this disclosure can provide various technical benefits. For instance, a power management system can enable a facility to be operated in a more efficient and effective manner. As an example, a power management system can regulate the amount of electrical power that is consumed by the electrical devices at the facility, while prioritizing the delivery of electrical power to electrical devices are relatively more important to the operation of the facility (for example, "mission critical" devices or systems) than others. Accordingly, the facility can sustain operations, even despite variations in the consumption of electrical power by the electrical devices over time. In some implementations, a power management system can enable a facility to expand its effective operational capacity (for example, by enabling more electrical devices to be deployed in the facility than could otherwise be deployed without the assistance of the power management system). In some implementations, the power management system can reduce the overall amount of electrical power consumed by a facility, thereby decreasing the wear on the electrical distribution systems, reducing maintenance costs, and reducing the costs of obtaining electrical power.

In an aspect, according to a method, a power management system obtains first data regarding a plurality of groups of electrical devices. Each of the groups is disposed in a different respective zone of a facility. The first data includes an indication of a budget and, for each of the groups, an indication of a respective priority metric associated with the group. The power management system allots, based on the first data, a respective amount of electrical power for use by each of the groups. The power management system obtains second data regarding the groups. The second data includes, for each of the groups, an indication of a respective amount of electrical power consumed by the group. The power management system determines that a first group of the plurality of groups has consumed a first amount of electrical power, and that the first amount of electrical power is greater than or equal to a second amount of electrical power that had been allotted for use by the first group. In response to determining that the first group has consumed the first amount of electrical power, and that the first amount of electrical power is greater than or equal to the second amount of electrical power, the power management system re-allots at least a portion of a third amount of electrical power that had been allotted for use by a second group of the plurality of groups for use by the first group instead.

Implementations of this aspect can include one or more of the following features.

In some implementations, the second data can be received from a plurality of local distribution units remote from the power management system. Each of the local distribution units can include a respective electrical power usage sensor electrically coupled to a different one of the groups.

In some implementations, the budget can correspond to a respective amount of money.

In some implementations, the first amount of electrical power can correspond to a first electrical run time, and the second amount of electrical power can correspond to a second electrical run time.

In some implementations, the method can further include determining, using the power management system, that the first amount of electrical power satisfies one or more termination criteria, and responsive to determining that the first amount of electrical power satisfies one or more termination criteria, terminating, using the power management system, a delivery of electrical power to the first group In some implementations, terminating the delivery of electrical power to the first group can include transmitting, to a local distribution unit electrically coupled to the first group, a command to disconnect the first group from a power source.

In some implementations, re-allotting at least the portion of the third amount of electrical power that had been allotted to the second group for use by the first group can include determining that the priority metric associated with the second group is lower than the priority metric associated with the first group, and determining that that the second group has consumed a fourth amount of electrical power, and that the fourth amount of electrical power is less than the third amount of electrical power.

In some implementations, the portion of the third amount of electrical power that is re-allotted for use by the first group can be determined as a function of the priority metric associated with the first group.

In some implementations, the portion of the third amount of electrical power that is re-allotted for use by the first group can be determined based on the priority metric associated with the second group.

In some implementations, the method can further include displaying, using a display device of the power management system, at least a portion of the first data and at least a portion of the second data.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

DETAILED DESCRIPTION

Figure 1:
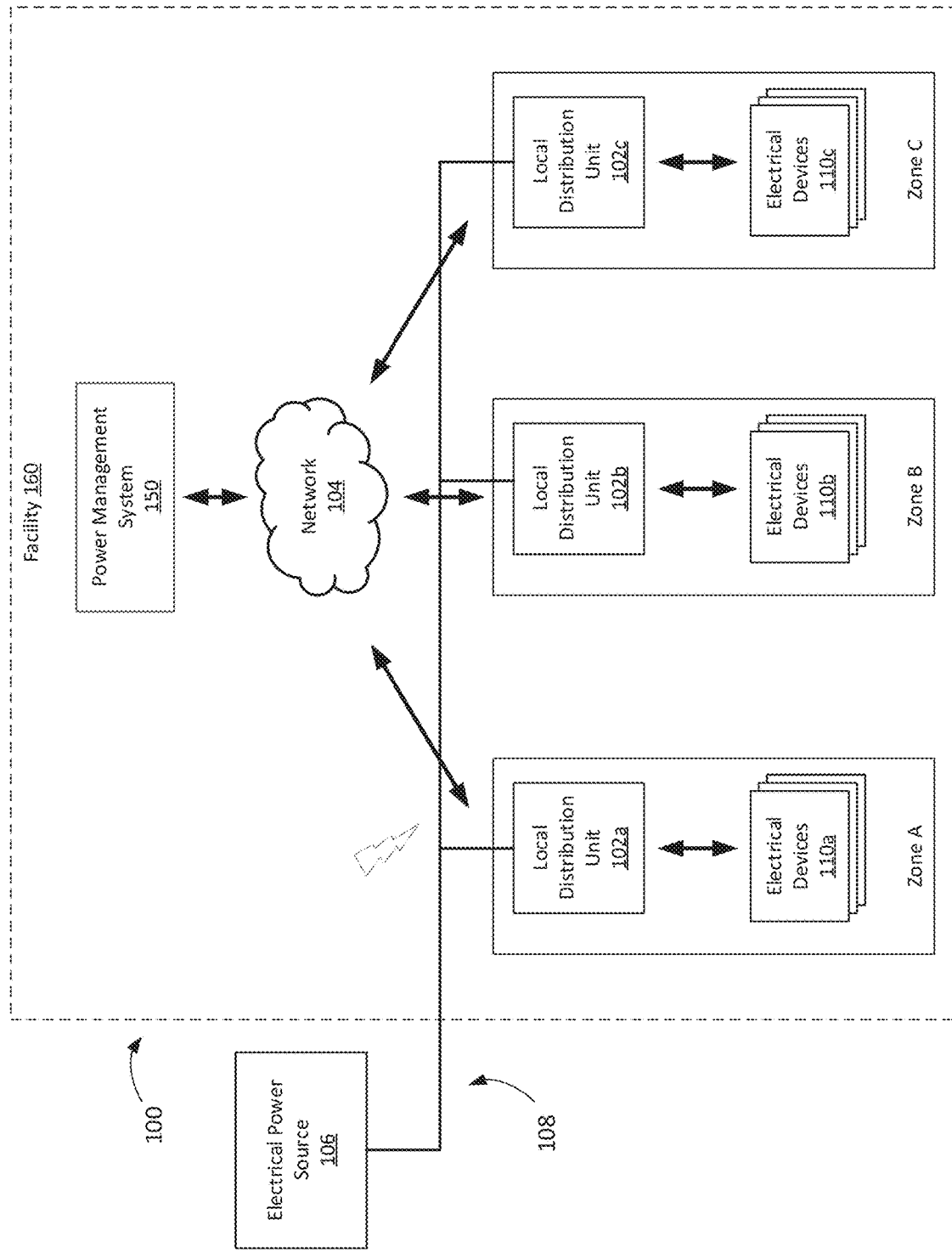
FIG. 1 is a diagram of an example system for controlling the distribution of electrical power to electrical devices in a facility.

FIG. 1 shows an example system 100 for controlling the distribution of electrical power to electrical devices in a facility. The system 100 includes a power management system 150 and several local distribution units 102*a*-120*c* communicatively coupled to one another through a network 104.

The local distribution units 102*a*-102*c* are configured to receive electrical power from an electrical power source 106 (for example, via an electrical grid 108), and to provide at least some of the electrical power to one or more respective electrical devices 110*a*-110*c*.

In some implementations, the electrical power source 106 can be a public utility, such as one or more power plants that are operated by one or more government entities or authorities. In some implementations, the electrical power source 106 can be a private utility, such as one or more power plants that are operated by one or more private entities. Similarly, the electrical grid 108 can be a public electrical grid or a private electrical grid. For example, the electrical grid 108 can include electrical substations, transmission lines, and distributions lines provided by one or more government entities or authorities or private entities.

The electrical devices 110*a*-110*c* can include any device that consumes electrical power during operation. As an example, the electrical devices 110*a*-110*c* can include lighting systems, such as lights and devices for controlling lights. As another example, the electrical devices 110*a*-110*c* can include appliances, such as refrigerators, freezers, water heaters, and cooking equipment. As another example, the electrical devices 110*a*-110*c* can include industrial equipment, such as manufacturing systems or material processing systems. As another example, the electrical devices 110*a*-110*c* can include computer systems, such as desktop computers, server computers, notebook computers, or other computer devices. As another example, the electrical devices 110*a*-110*c* can include telecommunications systems, such as telephone equipment or data network equipment. As another example, the electrical devices 110*a*-110*c* can include and climate control systems, such as heating, ventilation, and air conditioning (HVAC) systems. Although example electrical devices 110*a*-110*c* are described above, these are merely non-limiting examples. In practice, the electrical devices 110*a*-110*c* can include any other device that consumes electrical power during operation, either instead of or in addition to those described above.

In some implementations, at least a portion of the system 100 can be deployed in a facility 160. The facility 160 can be, for example, one or more buildings at a particular site or geographical location. For example, the facility 160 can include a single building, such as a residential building, an office building, a manufacturing plant, a data center, or other building. As another example, the facility 160 can include multiple buildings, such as one or more residential buildings, office buildings, manufacturing plants, and/or data centers in a particular site or geographical location. In some implementations, a facility can be maintained or operated by a particular individual or entity, such as a homeowner or a corporation.

In some implementations, the electrical devices 110*a*-110*c* can be divided into different groups, and each of the local distribution units 102*a*-102*c* can be configured to control the distribution of electrical power to a respective one of the groups. In some implementations, each group can correspond to a different zone or physical area within the facility 160. For instance, in the example shown in FIG. 1, the electrical devices 110*a* are deployed in a "Zone A," and the local distribution unique 102*a* is configured to control the distribution of electrical power to the electrical devices 110*a* in the Zone A. Further, the electrical devices 110*b* are deployed in a "Zone B," and the local distribution unique 102*b* is configured to control the distribution of electrical power to the electrical devices 110*b* in the Zone B. Further, the electrical devices 110*c* are deployed in a "Zone C," and the local distribution unique 102*c* is configured to control the distribution of electrical power to the electrical devices 110*c* in the Zone C. In some implementations, each group can correspond to a different logical grouping of electrical devices, regardless of the physical location of each of the electrical devices within the facility.

Although three groups are shown in FIG. 1, this is merely an illustrative example. In practice, a system 100 can include any number of groups, each having any number of electrical devices.

The power management system 150 controls the operation of each of the local distribution units 102*a*-102*c*. For example, the power management system 150 can allot electrical power to each of the groups of electrical devices 110*a*-110*c*, and instruct the local distribution units 102*a*-102*c* to distribute electrical power from the electrical power source 106 to the electrical devices 110*a*-110*c* in accordance with those allotments. The power management system 150 can transmit instructions or commands to the local distribution units 102*a*-102*c* via the network 104.

In some implementations, the power management system 150 can allot electrical power to the electrical devices 110*a*-110*c* based on one or more factors, such as the groupings of electrical devices 110*a*-110*c* in the facility, the relative importance of each group, and a budget associated with each group or with the facility as a whole.

In some implementations, the budget can be monetary budget, such as a particular upper limit of funds or a target amount of funds that can be expended to obtain electrical power from the electrical power source 106 over a period of time. In some implementations, the budget can be specified by a user, such as an administrator of the system 100 or an administrator of the facility 160. In some implementations, the power management system 150 can allot electrical power to the electrical devices 110a-110c according to a single budget (for example, a single budget specifying an upper limit of funds or a target amount of funds that can be expended to obtain electrical power for each and every one of the electrical devices 110a-110c over a period of time). In some implementations, the power management system 150 can allot electrical power to the electrical devices 110a-110c according to multiple different budgets (for example, different respective budgets for each of the groups of the electrical devices 110a-110c, or different respective budgets for each of the electrical devices 110a-110c).

Further, the power management system 150 can receive data regarding the consumption of electrical power by the electrical devices 110a-110c from each of the local distribution units 102a-102c, and modify the allotment of electrical power among the electrical devices 110a-110c based on the data. For example, the power management system 150 can receive sensor data regarding the consumption of electrical power from each of the local distribution units 102a-102c via the network 104, and transmit instructions or commands to modify the allotment of electrical power to the local distribution units 102a-102c via the network 104.

In some implementations, if the consumption of electrical power by a first group of electrical devices is nearing or exceeding the budget for the first group, the power management system 150 can determine whether at least a portion of the budget for another group of electrical devices (for example, a group of electrical devices having a lower priority or importance than that of the first group of electrical devices) can be re-allotted to the first group. This determination can be made using one or more power management rules, as described in further detail below.

In some implementations, if the budget for another group is available for re-allotment, the power management system 150 can modify the budgets of the groups accordingly, and instruct the appropriate local distribution units 102a-102c to distribute power in accordance with the modified budgets. In some implementations, if the budget for another group is not available for re-allotment, the power management system 5120 can instruct the appropriate local distribution unit 102a-102c to discontinue providing power to the first group of electrical devices, such that the budget is not exceeded (or the budget is not further exceeded).

In FIG. 1, the power management system 150 is illustrated as a single component. However, in practice, the power management system 150 can be implemented on one or more devices (for instance, one or more computing devices, each including at least one processor such as a microprocessor or microcontroller). As an example, the power management system 150 can be maintained and operated on a single computing device communicatively coupled to the network 104. As another example, the power management system 150 can be maintained on multiple computing devices that are communicatively coupled to the network 104 (for example, according to a cloud computing environment). As another example, the power management system 150 can implemented as a standalone device, such as a control panel that is configured to be mounted on a wall or a console in the facility 160.

The network 104 can be any communications network through which data can be transferred and shared. For example, the network 104 can be a local area network (LAN) or a wide-area network (WAN), such as the Internet. The network 104 can be implemented using various networking interfaces, for instance wireless networking interfaces (such as Wi-Fi, Bluetooth, or infrared) or wired networking interfaces (such as Ethernet or serial connection). The network 104 also can include combinations of more than one network, and can be implemented using one or more networking interfaces.

Figure 2:
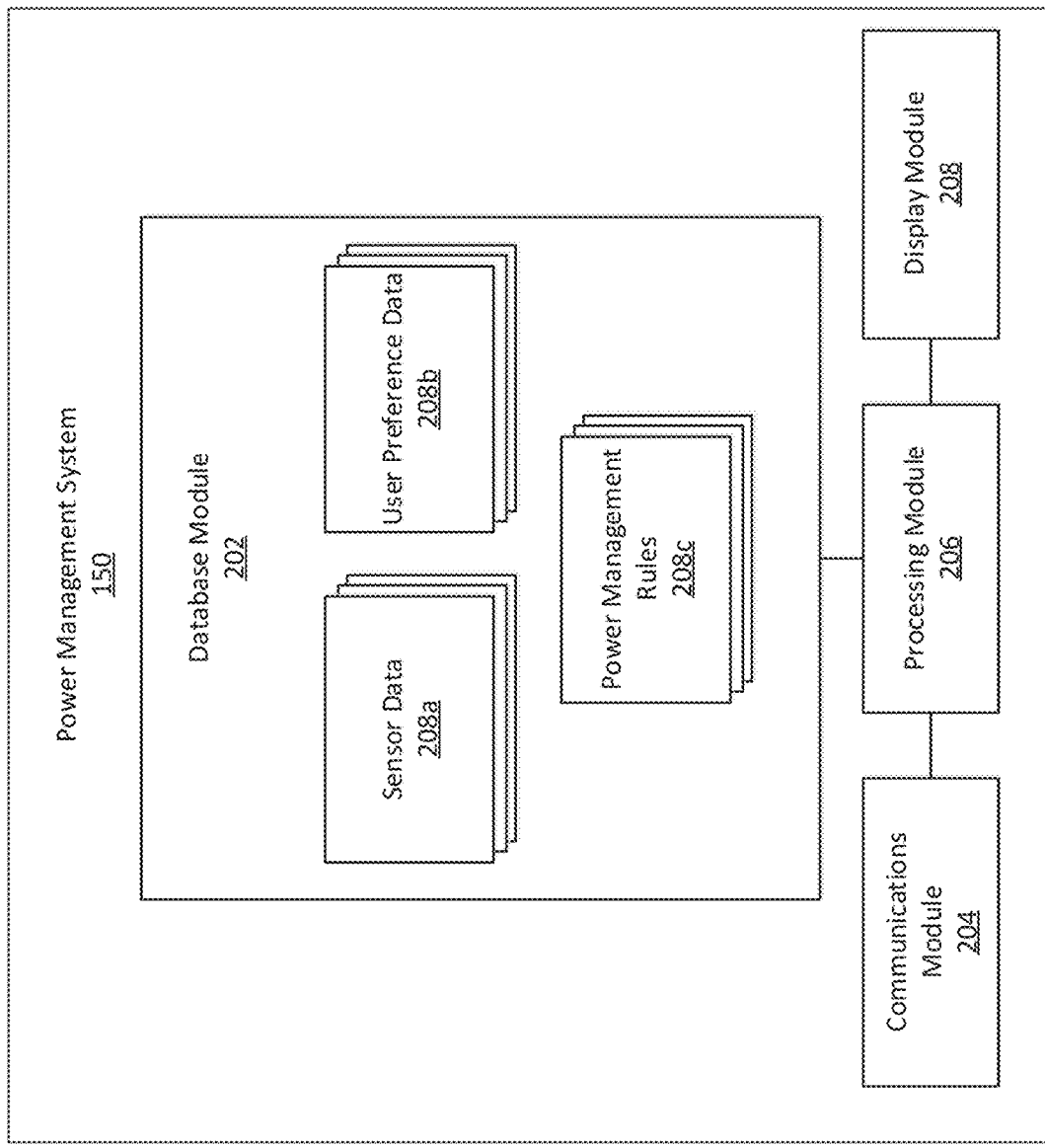
FIG. 2 is a diagram of an example power management system.

FIG. 2 shows various aspects of the power management system 150. The power management system 150 includes several modules that perform particular functions related to the operation of the system 100. For example, the power management system 150 can include a database module 202, a communications module 204, a processing module 206, and a display module 208.

The database module 202 maintains information related to controlling the distribution of electrical power to the electrical devices 110a-110c using the local distribution units 102a-102c.

The database module 202 can store sensor data 208a that regarding the operation of the electrical devices 110a-110c and the local distribution units 102a-102c. For example, the sensor data 208a can include sensor measurements indicating the amount of electrical power consumed by one or more of the electrical devices 110a-110c and the time during which the electrical power was consumed (for example, the time of day, the day of the week, and/or the date). As another example, the sensor data 208a can include sensor measurement indicating the rate at which one or more of the electrical devices 110a-110c consumed power over a period of time. As another example, the sensor data 208a can indicate a current or historical status of each of the electrical devices 110a-110c. For example, the sensor data 208a can indicate whether each of the electrical devices 110a-110c is "active" (for example, powered up and operating normally), "disabled" (for example, powered down,) or is associated with a "warning" (for example, powered up, but approaching budget limits for operation and may be shut down in the near future).

In some implementations, the sensor data 208a can include measurements for each of the electrical devices 110a-110 individually. In some implementations, the sensor data 208a can include measurements for each of several groups of the electrical devices 110a-110. For example, referring to FIG. 1, the sensor data 208a can include a first set of measurements for the electrical devices 110a in Zone A, a second set of measurements for the electrical devices 110b in Zone B, and a third set of measurements for the electrical devices 110c in Zone C.

In some implementations, the power management system 150 can receive at least some of the sensor data 208a from one or more of the local distribution units 102a-102c. In some implementations, the power management system 150 can receive at least some of the sensor data 208a from one or more other devices, such as a computer system or a server system separate from the system 100. In some implementations, the power management system 150 can receive at least some of the sensor data 208a via manual input by a user.

The database module 202 can also store user preference data 208b. The user preference data 208b can include information indicating a user's preferences or customizations regarding the operation of the system 100.

As an example, the user preference data 208b can include, for each group of electrical devices 110a-110c, a respective priority metric indicating the importance of that group relative to other groups. In some implementations, each of the priority metrics can be a respective numerical value. For example, priority metrics can range from 1-5, where groups having a priority metric value of 1 are the most important and groups having a priority metric value of 4 are the least important.

As another example, the user preference data 208b can include one or more budgets associated with each of the groups of electrical devices 110a-110c or with the facility 160 as a whole. In some implementations, a budget can be expressed as a monetary amount (such as in units of dollars). For instance, the user preference data 208b can include, for each group of electrical devices 110a-110c, a respective budget indicating a particular upper limit of funds or a target amount of funds that can be expended to obtain electrical power from the electrical power source 106 for the group of electrical devices 110a-110c over a period of time. In some implementations, the budget can be expressed as an amount of electrical power (such as in units of kilowatt hours (KWHs). For instance, the user preference data 208b can include, for each group of electrical devices 110a-110c, a respective power budget indicating a particular upper limit of electrical power or a target amount of electrical power that can be consumed by the group of electrical devices 110a-110c over a period of time. In some implementations, the budget can be expressed as an electrical runtime (such as in units of seconds, minutes, or hours). For instance, the user preference data 208b can include, for each group of electrical devices 110a-110c, a respective electrical runtime budget indicating a particular upper limit of time or a target amount of time during which the group of electrical devices 110a-110c can consume power.

In some implementations, the power management system 150 can receive at least some of the user preference data 208b from one or more other devices, such as a computer system or a server system separate from the system 100. In some implementations, the power management system 150 can receive at least some of the user preference data 208b via manual input by a user.

Further, the database module 202 can store power management rules 208c specifying how electrical power is to be allotted between the electrical devices 110a-110c under different conditions. For example, the power management rules 208c can specify that, based on the sensor data 208a and the user preference data 208b, each of the groups of groups of the electrical devices 110a-110c is to be allotted a respective amount of electrical power from the electrical power source 106. Further, the power management rules 208c can specify that, in particular circumstances, electrical power is to be re-allotted from one group of electrical devices 110a-110c to another. Further, the power management rules 208c can specify that, in particular circumstances, one or more groups of electrical devices 110a-110c should be shut down to reduce the consumption of electrical power. Further, the power management rules 208c can specify that instructions be transmitted to each of the local distribution units 102a-102c to carry out these actions. Example power management rules 208c are described in further detail below.

As described above, the power management system 150 also includes a communications module 204. The communications module 204 allows for the transmission of data to and from the power management system 150. For example, the communications module 204 can be communicatively connected to the network 104, such that it can transmit data to and receive data from each of the local distribution units 102a-102c. Information received from the local distribution units 102a-102c can be processed (for example, using the processing module 206) and stored (for example, using the database module 202).

As described above, the power management system 150 also includes a processing module 206. In some implementations, the processing module 206 can include one or more computer processors or programmable logic controllers (PLCs). The processing module 206 processes data stored or otherwise accessible to the power management system 150. For instance, the processing module 206 can process the sensor data 208a and the user preference data 208b in accordance with the power management rules 208c, to determine an amount of electrical power to be allotted to each of the groups of electrical devices 110a-110c. Further, the processing module 206 can generate instructions to each of the local distribution units 102a-102c (for example, to control the distribution of electrical power in accordance with the determined allotments), and transmit the instructions to each of the local distribution units 102a-102c (for example, using the communications module 204.

As another example, the processing module 206 can process the sensor data 208a and the user preference data 208b in accordance with the power management rules 208c, to determine whether to re-allot electrical power from group of electrical devices 110a-110c to another, and if so, the extent to which electrical power is to be re-allotted. Further, the processing module 206 can generate instructions to each of the local distribution units 102a-102c (for example, to control the distribution of electrical power in accordance with the determined re-allotments), and transmit the instructions to each of the local distribution units 102a-102c (for example, using the communications module 204.

As another example, the processing module 206 can process the sensor data 208a and the user preference data 208b in accordance with the power management rules 208c, to determine whether certain groups of electrical devices 110a-110c should be shut down. Further, the processing module 206 can generate instructions to each of the local distribution units 102a-102c (for example, to selectively shut down certain groups of electrical devices 110a-110c), and transmit the instructions to each of the local distribution units 102a-102c (for example, using the communications module 204).

As described above, the power management system 150 also includes a display module 208. The display module 208 presents information visually to a user. For example, the display module 208 can include one or more devices configured to present graphical information, such as a liquid crystal display (LCD), a light-emitting diode (LED) display, an organic light-emitting diode (OLED) display, or a cathode-ray tube (CRT) display. The display module 208 can presented any of the information described herein, such as some or all of the sensor data 208a, the user preference data 208b, and/or the power management rules 208c. In some implementations, the display module 208 can present a graphical user interface (GUI) to facilitate the presentation of data. Example GUIs are described below.

FIG. 2 shows various aspects of a local distribution unit 102a-102c. The local distribution unit 102a-102c includes several modules that perform particular functions related to the operation of the system 100. For example, the local distribution unit 102a-102c can include a sensor module 302, a communications module 304, a processing module 306, a display module 208 and a power control module 310.

Each of the local distribution units 102a-102c includes a sensor module 302 is configured to measure one or more properties of the electrical devices 110a-110c. As an example, the sensor module 302 can include one or more electrical power usage sensors, each electrically coupled to one or more of the electrical devices 110a-110c. Further, the electrical power usage sensors can measure the amount of electrical power that is consumed by the electrical devices 110a-110c over a period of time. In some implementations the sensor module 302 can obtain data similar to the sensor data 208a described with respect to FIG. 2.

Each of the local distribution units 102a-102c also includes a communications module 304. The communications module 304 allows for the transmission of data to and from the local distribution unit 102a-102c. For instance, the communications module 304 can be communicatively connected to the network 104, such that it can transmit data to and receive data from the power management system 150. As an example, the communications module 304 can transmit data obtained by the local distribution unit 102a-102c (for instance, sensor data from the sensor module 302) to the power management system 150. As another example, the communications module 304 can receive instructions or commands from the power management system 150. Information received from the power management system 150 can be processed (for example, using the processing module 306.

Each of the local distribution units 102a-102c also includes a processing module 306. In some implementations, the processing module 306 can include one or more computer processors or programmable logic controllers (PLCs). The processing module 306 processes data stored or otherwise accessible to the local distribution unit 102a-102c. As an example, the processing module 306 can process the sensor data from the sensor module 302, and transmit the sensor data to the power management system 150 using the communications module 304. As another example, the processing module 306 can receive instructions or commands from the power management system 150 via the communications module 304, and execute those instructions or commands. For instance, the processing module 306 can selectively deliver electrical power to one or more of the electrical devices 102a-102c via the power control module 310, in accordance with the allotments specified by the power management system 150.

The power control module 310 enables the local distribution unit 102a-102c to selectively deliver electrical power to one or more of the electrical devices 102a-102c. For example, the power control module 310 can include an input interface 312 for receiving electrical power from the electrical power source 106, and one or more output interfaces 314 for providing electrical power to one or more of the electrical devices 110a-110c. Each of the input interface 312 and the output interfaces 314 can include, for example, one or more pins, sockets, or receptacles configured to electrically couple to one or more wires, cables, or other conduits for carrying electrical power.

The electrical power received at the input interface 312 is provided to an electrical switch 316. When the electrical switch 316 is in a closed position, the electrical switch 316 provides the electrical power to the output interface 314, such that electrical power is distributed to each of the electrical devices 110a-110c. When the electrical switch 316 is in an open position, the output interface 314 is disconnected from the source of electrical power 106, such that the distribution of electrical power to the electrical devices 110a-110c is discontinued or terminated. The electrical switch 316 can be controlled based on one or more termination criteria. For example, by the processing module 306 can be controlled based on instructions or commands received from the power management system 150. In some implementations, the electrical switch 316 can be controlled manually by a user.

Each of the local distribution units 102a-102c also includes a display module 308. The display module 308 presents information visually to a user. For example, the display module 308 can include one or more devices configured to present graphical information, such as a liquid crystal display (LCD), a light-emitting diode (LED) display, an organic light-emitting diode (OLED) display, or a cathode-ray tube (CRT) display. The display module 308 can presented any of the information described herein, such as some or all of the sensor data obtained by the sensor module 302, the instructions or commands received from the power management system 150, and/or the operational state of the power control module 310 (for example, open or closed). In some implementations, the display module 308 can present a graphical user interface (GUI) to facilitate the presentation of data. Example GUIs are described below.

Figure 4:
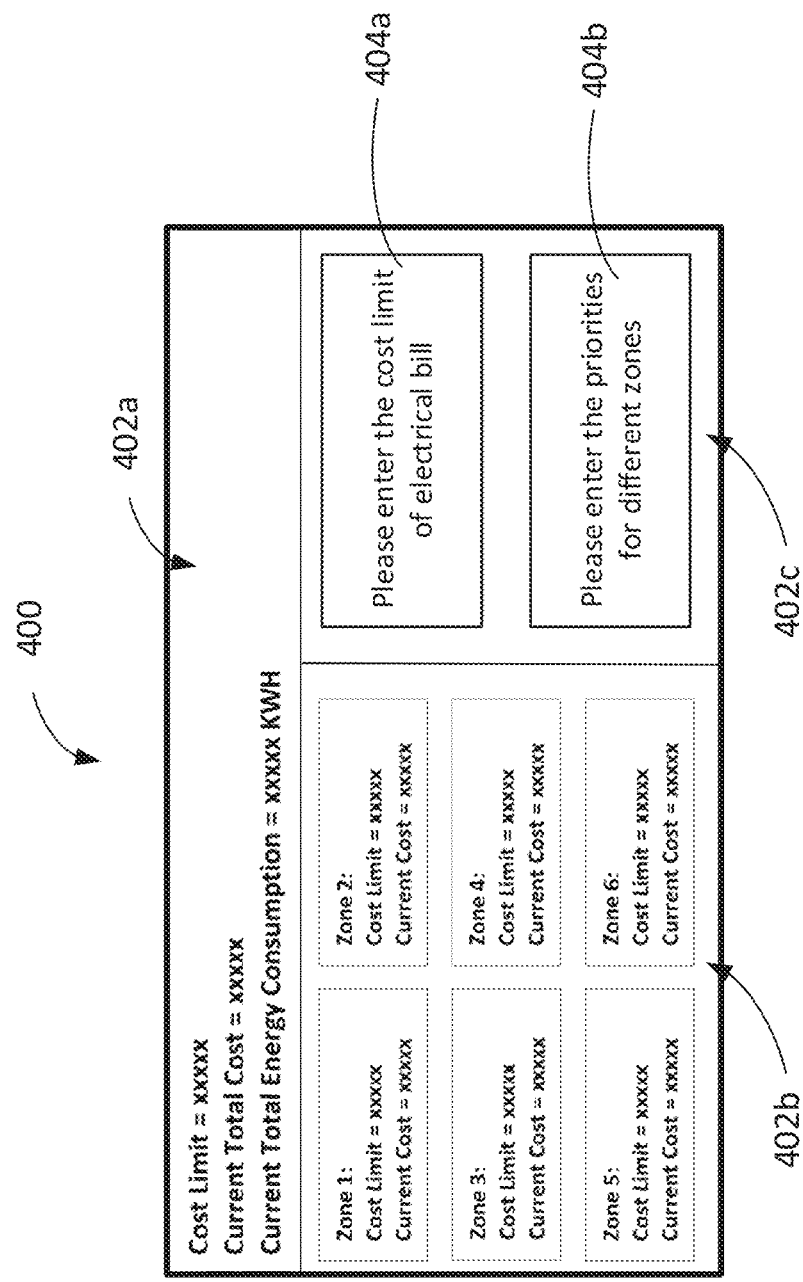
FIG. 4 is a diagram of an example GUI.

In FIG. 4, the local distribution unit 102a-102c is illustrated as a single component. However, in practice, each of the local distribution units 102a-102c can be implemented on one or more devices (for instance, one or more computing devices, each including at least one processor such as a microprocessor or microcontroller). As an example, each of the local distribution units 102a-102c can be maintained and operated on a single computing device communicatively coupled to the network 104. As another example, each of the local distribution units 102a-102c can be maintained on multiple computing devices that are communicatively coupled to the network 104 (for example, according to a cloud computing environment). As another example, each of the local distribution units 102a-102c can implemented as a standalone device, such as a control panel that is configured to be mounted on a wall or a console in the facility 160.

FIG. 4 shows an example GUI 400 for presenting information to a user. The GUI 400 can be displayed, for example, by the power management system 150 using the display module 208.

The GUI 400 includes a portion 402a for displaying information regarding the budget associated with the facility 160 has a whole, the electrical power that has been consumed by each of the electrical devices 110a-110c at the facility 160, and the associated cost of the consumed electrical power. As an example, the budget can be a particular monetary limit specified by the user, and can be expressed as a monetary amount (such as in units of dollars). As another example, the electrical power that has been consumed can be expressed in units of KWHs. As another example, the cost can be expressed in units of dollars.

The GUI 400 also includes a portion 402b for displaying information regarding each of the groups or zones in the facility 160. For instance, the portion 402b can display, for each group or zone, the amount of electrical power that has been allotted to that group or zone, and the electrical power that has been consumed by each of the electrical devices 110a-110c of that group or zone, and the associated cost of the consumed electrical power. As an example, the amount of electrical power that has been allotted to that group or zone can be expressed in units of dollars or KWHs. As another example, the electrical power that has been consumed can be expressed in units of KWHs. As another example, the cost can be expressed in units of dollars.

The GUI 400 also includes a portion 402c for receiving input from a user. As an example the portion 402c can include a graphical element 404a that enables the user to specify a budget for the facility 160. As another example the portion 402c can include a graphical element 404b that enables the user to specify the priority of each of the groups or zones of electrical devices 110a-110c.

Figures 5A, 5B:
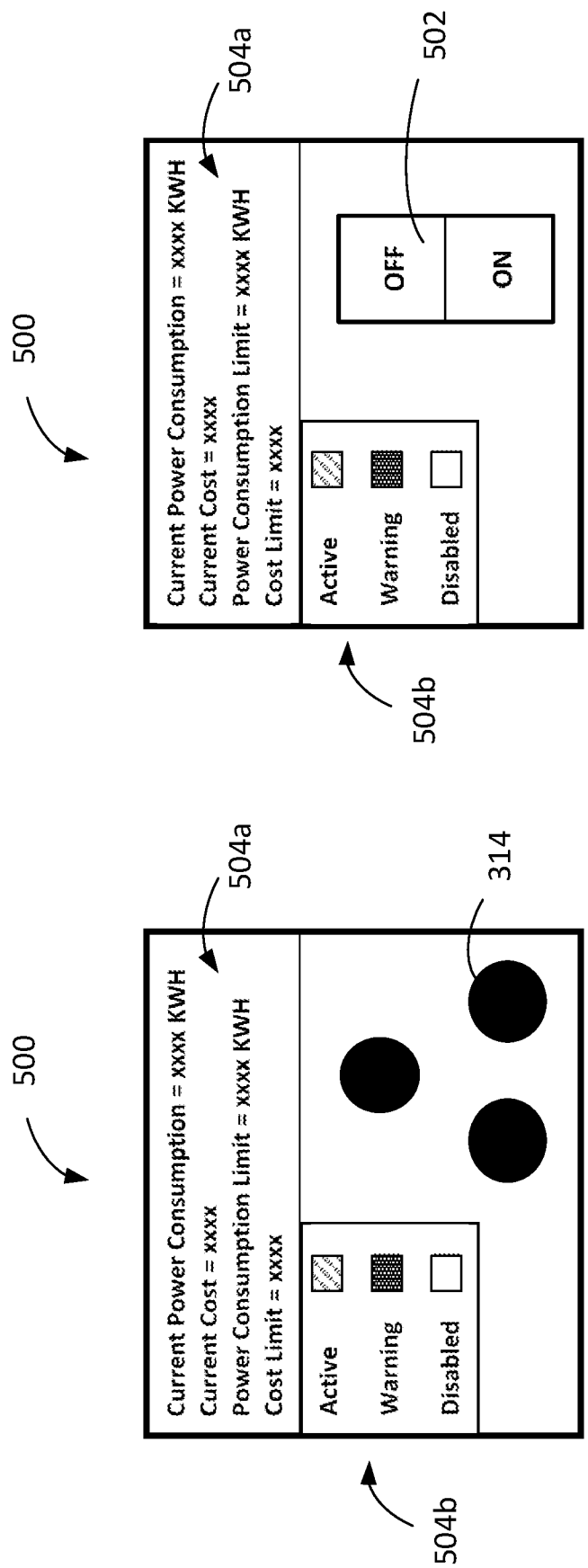
FIGS. 5A and 5B a diagrams of example GUIs.

FIGS. 5A and 5B show an example GUI 500 for presenting information to a user. The GUI 500 can be displayed, for example, by a local distribution unit 102a-102c using a display module 308. As shown in FIG. 5A, in some implementations, the GUI 500 can be displayed alongside the output interface 314 of the local distribution unit 102a-102c, such an electrical respectable. As shown in FIG. 5B, in some implementations, the GUI 500 can be displayed alongside a control switch 502 for manually controlling the power control module 310.

The GUI 500 includes a portion 504a for displaying information regarding the electrical devices 110a-110c of a particular group or zone. For instance, the portion 504a can display the electrical power that has been consumed by the electrical devices 110a-110c of that group or zone (and the associated cost) and the amount of electrical power that has been allotted to that group or zone (and the associated cost). As an example, the amount of electrical power that has been allotted to that group or zone can be expressed in units of KWHs, and the associated cost can be expressed in units of dollars. As another example, the electrical power that has been consumed can be expressed in units of KWHs, and the associated cost can be expressed in units of dollars.

The GUI 500 also includes a portion 504b for display information regarding the state of the electrical devices 110a-110c of a particular group or zone. For example, the portion 504b can indicate whether the electrical devices 110a-110c in the group or zone are "active" (for example, powered up and operating normally), "disabled" (for example, powered down,) or is associated with a "warning" (for example, powered up, but approaching budget limits for operation and may be shut down in the near future).

Figure 6:
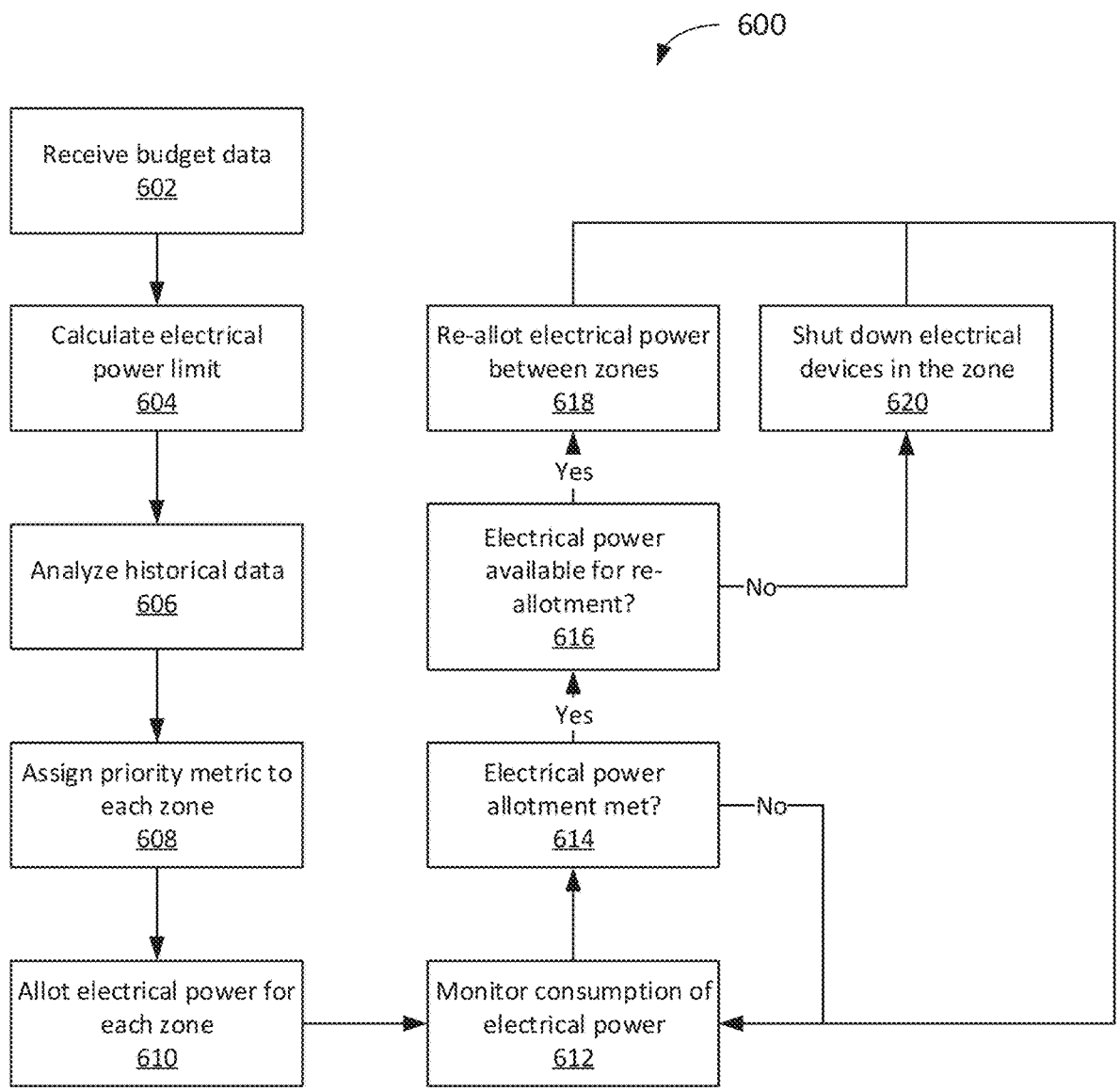
FIG. 6 is a flow chart diagram of an example process for allotting electrical power to electrical devices in a facility

As described above, the power management system 150 can allot electrical power to the electrical devices 110a-110c based on one or more factors, such as the groupings of electrical devices 110a-110c in the facility, the relative importance of each group, and a budget associated with each group or with the facility as a whole. As example process 600 for allotting electrical power to electrical devices in a facility is shown in FIG. 6. In some implementations, the process 600 can be performed by the systems described in this disclosure (for example, the power management system 150 and/or the local distribution units 102a-102c shown and described with respect to FIGS. 1-3) using one or more processors (for example, using the processor or processors 810 shown in FIG. 8). In some implementations, at least a portion of the process 600 can be defined using one or more of the power management rules 208c In the process 600, a system receives budget regarding a particular facility (block 602). In some implementations, the budget can be expressed as a monetary amount (such as in units of dollars). In some implementations, the budget can be specified by a user, for example via the GUI 400 shown in FIG. 4.

The system calculates an electrical power limit based on the budget (block 604). As an example, the system can retrieve information regarding the cost of obtaining electrical power from a source of electrical power 106 (for example, in units of KWH per dollar), and determine the amount of electrical power that can be obtained without exceeding the specified budget.

Further, the system analyzes historical data regarding the usage of electrical power by the electrical devices in the facility (block 606). As an example, the historical data can indicate the amount of electrical power that was consumed by the electrical devices over one or more periods of time (for example, hourly, daily, weekly, monthly, yearly, or some other time interval). This can be beneficial, for example, in enabling the system to estimate a future usage of electrical power by the electrical devices.

Further, the system assigns a priority metric to each of the groups or zones of electrical devices (block 608). As described above, a priority metric indicates the importance of a particular group or zone relative to other groups or zones. In some implementations, each of the priority metrics can be a respective numerical value. For example, priority metrics can range from 1-5, where groups having a priority metric value of 1 are the most important and groups having a priority metric value of 4 are the least important.

In some implementations, the system can assign a priority metric to a group or zone based on input from a user (for example, input received from the unit using the GUI 400 shown in FIG. 4). In some implementations, the system can automatically assign a priority metric to a group or zone. For example, if the electrical devices of a particular group or zone are intended to be operated on a continuous basis, the system can automatically assign that group or zone the highest priority metric (for example, a priority metric of 1).

Further, the system allots electrical power to each group or zone in accordance with the budget (block 610). For example, the system can allot electrical power to each group or zone, such that the total amount of allotted electrical power does not exceed the calculated power limit (for example, in block 604), and such that the total cost of obtaining the allowed electrical power does not exceed the budget (for example, as specified in block 602).

In some implementations, the system can allot electrical power based on the priority metrics for each of the groups or zones. For example, based on the priority metrics for each of the groups or zones, the system can allot a particular amount of time (for example, per day or month) during which the electrical devices in each group or zone can consume electrical power. Table 1 shows an example allotment of electrical power.

TABLE 1

Example allotment of electrical power to a group or zone based on the priority metric of the group or zone.

| Priority Metric Value | Number of allotted hours per day (weekdays) | Number of allotted hours per day (weekends) | Total allotted hours per month |
|---|---|---|---|
| 1 | 24 | 24 | 720 |
| 2 | ≤12 | ≤6 | ≤312 |
| 3 | ≤6 | ≤3 | ≤156 |
| 4 | ≤3 | ≤1 | ≤74 |

In the example shown in Table 1, the electrical devices in a group or zone having a priority metric of 1 can operate 24 hours a day, during both weekdays and weekend days. Further, the electrical devices in a group or zone having a priority metric of 2 can operate up to 12 hours a day during weekdays, and up to six hours a day during weekend days. Further, the electrical devices in a group or zone having a priority metric of 3 can operate up to six hours a day during weekdays, and up to three hours a day during weekend days. Further, the electrical devices in a group or zone having a priority metric of 4 can operate up to three hours a day during weekdays, and up to one hour a day during weekend days.

Although Table 1 shows an allotment of electrical power based on priority, this is merely an illustrative example. In practice, the hours that are assigned to each group or zone based the priority metrics can vary, depending on the implementation. Further, although Table 1 shows an example allotment based on four different priority levels, this is also merely an illustrative example. In practice, electrical power can be allotted based on any number of priority levels (for example, one, two, three, four, five, or more).

The system monitors the consumption of electrical power by each of the groups or zones (block 612). For example, the system can collect sensor data obtained by the sensor modules 302 of each of the local distribution units 102a-102c. In some implementations, the system can monitor the consumption of electrical power on a continuous basis, a periodic basis (for example, once a minute, hourly, daily, or according to some other period), or intermittently.

As a part of the monitoring process, the system determines whether the amount of electrical power that is consumed by a particular group or zone meets or exceeds the amount of electrical power that has been allotted for use by that group or zone (block 614). If the system determines that this is not the case, the system continues to monitor the consumption of electrical power by each of the groups or zones.

If the system determines that amount of electrical power that is consumed by a particular group or zone meets or exceeds the amount of electrical power that has been allotted for use by that group or zone, the system determines whether electrical power is available for re-allotment to that group or zone (block 616). For example, if a first group or zone has consumed all of the electrical power that had been allotted to it, but a second group or zone has not yet consumed all of the electrical power that had been allotted to it, at least some of the electrical power that had been allotted to the second group or zone can be re-allotted to the first group or zone instead.

In some implementations, the re-allot of electrical power can be determined based on the priority metrics of the groups or zones. For instance, the system can re-allot electrical power from a group or zone having a lower priority to a group or zone having a higher priority. However, the system can refrain from re-allotting electrical power from a group or zone having a higher priority to a group or zone having a lower priority. As an example, the system can re-allot electrical power from a group or zone having a priority metric of 4 to a group or zone having a priority metric of 1. As another example, the system can refrain from re-allotting electrical power from a group or zone having a priority metric of 2 to a group or zone having a priority metric of 3.

In some implementations, the re-allotment of power between groups or zones can be calculated based on a power consumption factor (PCF) associated with each of the priority levels. Example power consumption factors are shown in Table 2.

TABLE 2

Example power consumption factors for a group or zone based on the priority metric of the group or zone.

| Priority Metric Value | Power Consumption Factor (PCF) | Number of hours to be re-allotted to a recipient group or zone |
|---|---|---|
| 1 | N/A | N/A |
| 2 | <0.5 | (24 * (1 − PCF))/(priority of recipient) |
| 3 | <0.8 | (24 * (1 − PCF))/(priority of recipient) |
| 4 | <0.9 | (24 * (1 − PCF))/(priority of recipient) |

In the example shown in Table 2, a group or zone having a priority metric of 1 does not have a PCF, and electrical power cannot be re-allotted from that group or zone to another group or zone. Further, a group or zone having a priority metric of 2 has a PCF of 0.5 or less, a group or zone having a priority metric of 3 has a PCF of 0.8 or less, and a group or zone having a priority metric of 4 has a PCF of 0.9 or less. The amount of electrical power that can be re-allotted from one group or zone to another group or zone can be calculated using the function:

$$h_{available} = ((24*(1-PCF)))/p_{receipient}, \quad \text{(Eq. 1)}$$

where $h_{available}$ is the number of allotted hours of run time that is available for re-allotment from a first group or zone to a second group or zone, PCF is the power consumption factor of the first group or zone, and $p_{recipient}$ is the priority metric of the second group or zone.

In the example shown in Table 2, a group or zone having a priority metric of 3 has up to 2.4 hours of run time that is available for re-allotment to a group or zone having a priority metric of 2 (for instance, (24*(1−0.8)/2)). As another example, a group or zone having a priority metric of 4 has up to 1.2 hours of run time that is available for re-allotment to a group or zone having a priority metric of 2 (for instance, (24*(1−0.9)/2)). As another example, a group or zone having a priority metric of 3 has up to 4.8 hours of run time that is available for re-allotment to a group or zone having a priority metric of 1 (for instance, (24*(1−0.8)/1)).

Although Table 2 shows a re-allotment of electrical power based on priority, this is merely an illustrative example. In practice, the PCFs that are assigned to each group or zone based the priority metrics can vary, depending on the implementation. Further, although Table 2 shows an example re-allotment based on four different priority levels, this is also merely an illustrative example. In practice, electrical power can be re-allotted based on any number of priority levels (for example, one, two, three, four, five, or more).

In some implementations, the system can determine whether electrical power is available for re-allotment to a group or zone by determining (i) the electrical run time is has not yet been used and is available for re-allotment from another group or zone (for example, as described above), and (ii) whether re-allotting electrical run time would cause the consumption of electrical power by the groups or zones to exceed the specified budget. If either (i) no electrical run time is available for re-allotment from another group or zone or (ii) re-allotting electrical run time would cause the consumption of electrical power by the groups or zones to exceed the specified budget, the system can determine that electrical power cannot be re-allotted. If (i) electrical run time is available for re-allotment from another group or zone and (ii) re-allotting electrical run time would not cause the consumption of electrical power by the groups or zones to exceed the specified budget, the system can determine that electrical power can be re-allotted.

If the system determines that electrical power can be re-allotted to the group or zone, the system re-allots electrical power accordingly (block 618). For example, the system can re-allot at least some of the electrical run time from a first group or zone or a second group or zone, such that the second group or zone has additional time to operate. In some limitations, the system can re-allot electrical power in accordance with the PCF, priority, and budget considerations discussed above.

If the system determines that electrical power cannot be re-allotted to the group or zone, the system shuts down the electrical devices in that group or zone (block 620). For example, the system can transmit instructions or commands to the appropriate local distribution unit 102a-102c to discontinue or terminate the delivery of electrical power to the electrical describes (for example, by opening the electrical switch 316 of the power control module 310).

The system continues monitoring the consumption of electrical power, and continues to determine whether to re-allot electrical power between the groups or zones or whether to shut down the electrical devices of a particular group or zone.

Example Processes

Figure 7:
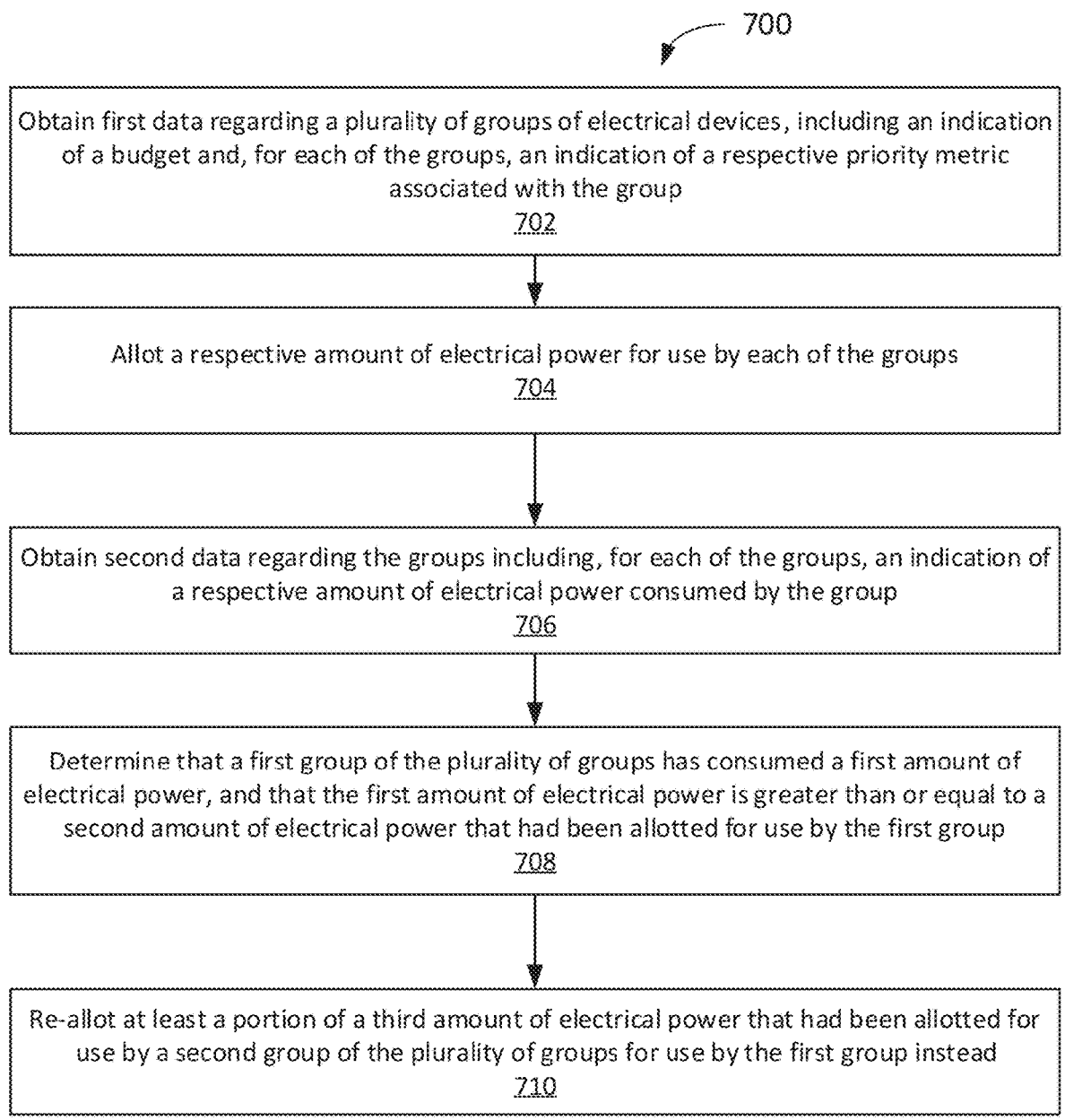
FIG. 7 is a flow chart diagram of example process for controlling the distribution of electrical power to electrical devices in a facility.

An example process 700 for controlling the distribution of electrical power to electrical devices in a facility is shown in FIG. 7. In some implementations, the process 700 can be performed by the systems described in this disclosure (for example, the power management system 150 and/or the local distribution units 102a-102c shown and described with respect to FIGS. 1-3) using one or more processors (for example, using the processor or processors 810 shown in FIG. 8).

In the process 700, a power management system obtains first data regarding a plurality of groups of electrical devices (block 702). Each of the groups is disposed in a different respective zone of a facility. The first data includes an indication of a budget. The first data also includes, for each of the groups, an indication of a respective priority metric associated with the group. In some implementations, the budget can correspond to an amount of money.

The power management system allots, based on the first data, a respective amount of electrical power for use by each of the groups (block 704). In some implementations, the amounts of electrical power can be expressed in units of KWHs. In some implementations, the amounts of electrical power can correspond to respective electrical run times.

The power management system obtains second data regarding the groups (block 706). The second data includes, for each of the groups, an indication of a respective amount of electrical power consumed by the group. In some implementations, the second data can be received from one or more local distribution units (for example, the local distribution units 102a-102c described above) that are remote from the power management system. Further, at least some of the local distribution units can include a respective electrical power usage sensor electrically coupled to a different one of the groups.

The power management system determines that a first group of the plurality of groups has consumed a first amount of electrical power, and that the first amount of electrical power is greater than or equal to a second amount of electrical power that had been allotted for use by the first group (block 708). In some implementations, the first amount of electrical power can corresponds to a first electrical run time, and the second amount of electrical power can correspond to a second electrical run time.

In response to determining that the first group has consumed the first amount of electrical power, and that the first amount of electrical power is greater than or equal to the second amount of electrical power, the power management system re-allots at least a portion of a third amount of electrical power that had been allotted for use by a second group of the plurality of groups for use by the first group instead (block 710).

In some implementations, re-allotting at least the portion of the third amount of electrical power that had been allotted to the second group for use by the first group can include determining that the priority metric associated with the second group is lower than the priority metric associated with the first group, and determining that that the second group has consumed a fourth amount of electrical power, and that the fourth amount of electrical power is less than the third amount of electrical power. In some implementations, the third amount of electrical power and the fourth amount of electrical power can corresponds to respective electrical run times.

In some implementations, the portion of the third amount of electrical power that is re-allotted for use by the first group can be determined as a function of the priority metric associated with the first group. In some implementations, the portion of the third amount of electrical power that is re-allotted for use by the first group can be determined based on a priority metric associated with the second group. For example, as described above, the priority metric associated with the second group can correspond to a particular PCF value. The PCF value and the priority metric of the first group can be used as inputs in a function to determine an amount of electrical power that was previously allotted to the second group that is available for re-allotment for use by the first group instead.

In some implementations, according to the process 700, the power management system can determine that the first amount of electrical power satisfies one or more termination criteria, and in response, terminate a delivery of electrical power to the first group. Terminating the delivery of electrical power to the first group can include transmitting, to a local distribution unit electrically coupled to the first group, a command to disconnect the first group from a power source.

Figure 3:
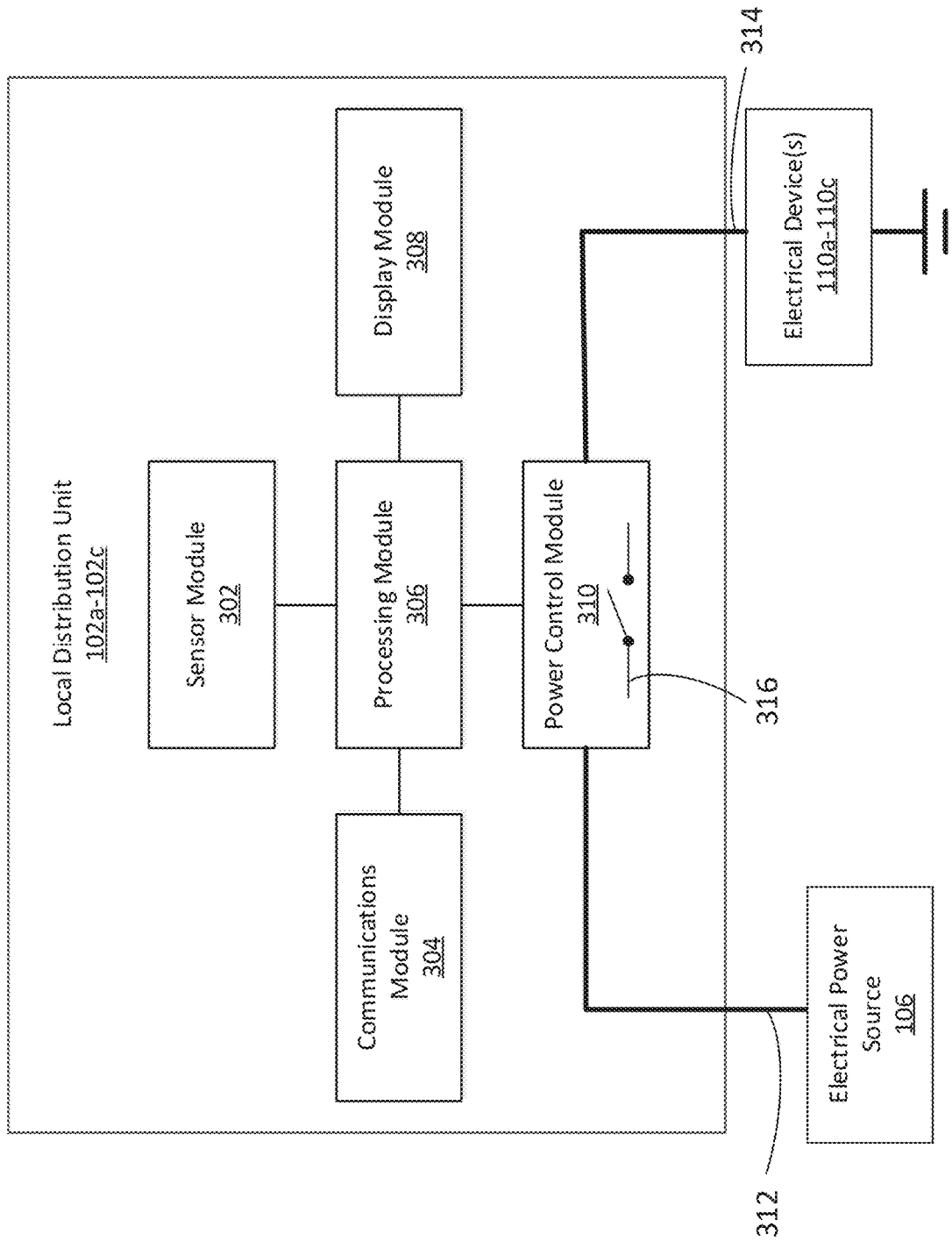
FIG. 3 is a diagram of an example local distribution unit.

In some implementations, according to the process 700, the power management system can display at least a portion of the first data and at least a portion of the second data using a display device (for example, using a display module 208 or a display module 308, as described with respect to FIGS. 2 and 3).

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 and power management system 150 can be implemented using digital electronic circuitry, or in computer software, firmware, or hardware, or in combinations of one or more of them. In another example, the processes 600 and 700 shown in FIGS. 6 and 7 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 8:
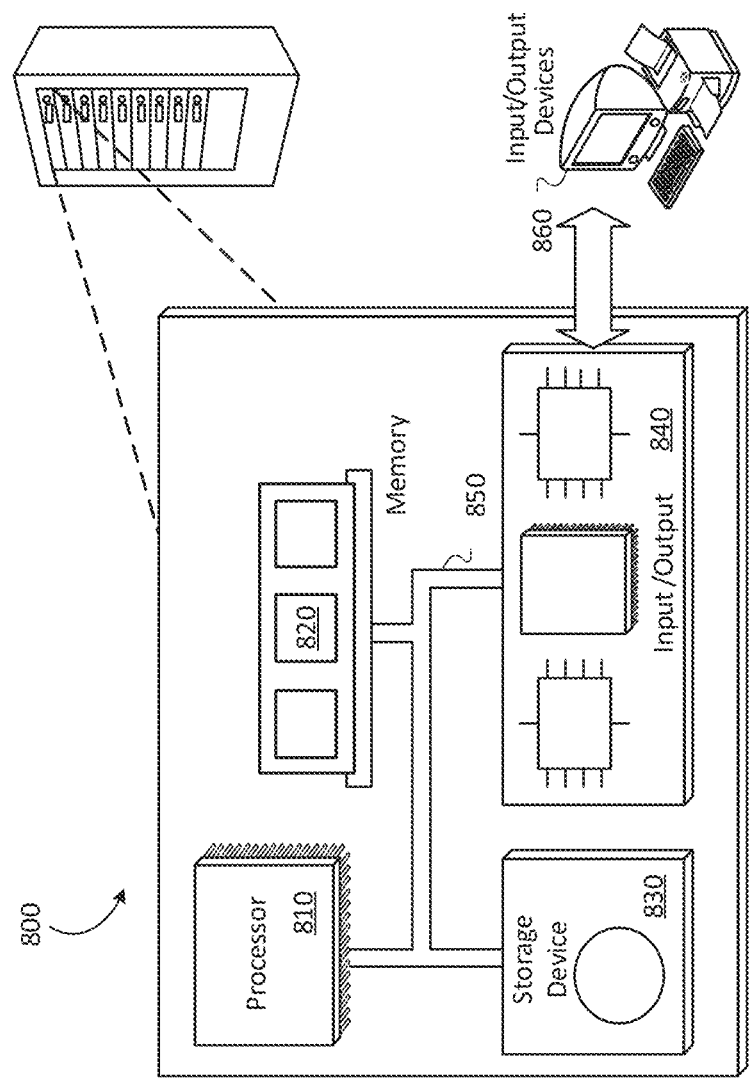
FIG. 8 is a schematic diagram of an example computer system.

FIG. 8 shows an example computer system 800 that includes a processor 810, a memory 820, a storage device 830 and an input/output device 840. Each of the components 810, 820, 830 and 840 can be interconnected, for example, by a system bus 850. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the system 800.

The input/output device 840 provides input/output operations for the system 800. In some implementations, the input/output device 840 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 860. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A method comprising:
    obtaining, using a power management system, first data regarding a plurality of groups of electrical devices, wherein each of the groups is disposed in a different respective zone of a facility, and wherein the first data comprises an indication of a budget and, for each of the groups, an indication of a respective priority metric associated with the group;
    allotting, using the power management system and based on the first data, a respective amount of electrical power for use by each of the groups;
    obtaining, using the power management system, second data regarding the groups, wherein the second data comprises, for each of the groups, an indication of a respective amount of electrical power consumed by the group;
    determining, using the power management system, that a first group of the plurality of groups has consumed a first amount of electrical power, and that the first amount of electrical power is greater than or equal to a second amount of electrical power that had been allotted for use by the first group; and
    in response to determining that the first group has consumed the first amount of electrical power, and that the first amount of electrical power is greater than or equal to the second amount of electrical power, re-allotting, using the power management system, at least a portion of a third amount of electrical power that had been allotted for use by a second group of the plurality of groups for use by the first group instead.

2. The method of claim 1, wherein the second data is received from a plurality of local distribution units remote from the power management system, and wherein each of the local distribution units comprises a respective electrical power usage sensor electrically coupled to a different one of the groups.

3. The method of claim 1, wherein the budget corresponds to an amount of money.

4. The method of claim 1, wherein the first amount of electrical power corresponds to a first electrical run time, wherein the second amount of electrical power corresponds to a second electrical run time.

5. The method of claim 1, further comprising:
    determining, using the power management system, that the first amount of electrical power satisfies one or more termination criteria, and
    responsive to determining that the first amount of electrical power satisfies one or more termination criteria, terminating, using the power management system, a delivery of electrical power to the first group.

6. The method of claim 5, wherein terminating the delivery of electrical power to the first group comprises:
    transmitting, to a local distribution unit electrically coupled to the first group, a command to disconnect the first group from a power source.

7. The method of claim 1, wherein re-allotting at least the portion of the third amount of electrical power that had been allotted to the second group for use by the first group comprises:
    determining that the priority metric associated with the second group is lower than the priority metric associated with the first group, and
    determining that that the second group has consumed a fourth amount of electrical power, and that the fourth amount of electrical power is less than the third amount of electrical power.

8. The method of claim 7, wherein the portion of the third amount of electrical power that is re-allotted for use by the first group is determined as a function of the priority metric associated with the first group.

9. The method of claim 7, wherein the portion of the third amount of electrical power that is re-allotted for use by the first group is determined based on a priority metric associated with the second group.

10. The method of claim 1, further comprising:
    displaying, using a display device of the power management system, at least a portion of the first data and at least a portion of the second data.

11. A system comprising:
    one or more processors; and
    one or more non-transitory computer readable media storing instructions that, when executed by the one or more processors, cause the one or more processors to perform operations comprising:
        obtaining first data regarding a plurality of groups of electrical devices, wherein each of the groups is disposed in a different respective zone of a facility, and wherein the first data comprises an indication of a budget and, for each of the groups, an indication of a respective priority metric associated with the group;
        allotting, based on the first data, a respective amount of electrical power for use by each of the groups;
        obtaining second data regarding the groups, wherein the second data comprises, for each of the groups, an indication of a respective amount of electrical power consumed by the group;
        determining that a first group of the plurality of groups has consumed a first amount of electrical power, and that the first amount of electrical power is greater than or equal to a second amount of electrical power that had been allotted for use by the first group; and
        in response to determining that the first group has consumed the first amount of electrical power, and that the first amount of electrical power is greater than or equal to the second amount of electrical power, re-allotting at least a portion of a third amount of electrical power that had been allotted for use by a second group of the plurality of groups for use by the first group instead.

12. The system of claim 11, wherein the second data is received from a plurality of local distribution units remote from the power management system, and wherein each of the local distribution units comprises a respective electrical power usage sensor electrically coupled to a different one of the groups.

13. The system of claim 11, wherein the budget corresponds to an amount of money.

14. The system of claim 11, wherein the first amount of electrical power corresponds to a first electrical run time, wherein the second amount of electrical power corresponds to a second electrical run time.

15. The system of claim 11, further comprising:
determining, using the power management system, that the first amount of electrical power satisfies one or more termination criteria, and
responsive to determining that the first amount of electrical power satisfies one or more termination criteria, terminating, using the power management system, a delivery of electrical power to the first group.

16. The system of claim 15, wherein terminating the delivery of electrical power to the first group comprises:
transmitting, to a local distribution unit electrically coupled to the first group, a command to disconnect the first group from a power source.

17. The system of claim 11, wherein re-allotting at least the portion of the third amount of electrical power that had been allotted to the second group for use by the first group comprises:
determining that the priority metric associated with the second group is lower than the priority metric associated with the first group, and
determining that that the second group has consumed a fourth amount of electrical power, and that the fourth amount of electrical power is less than the third amount of electrical power.

18. The system of claim 17, wherein the portion of the third amount of electrical power that is re-allotted for use by the first group is determined as a function of the priority metric associated with the first group.

19. The method of claim 17, wherein the portion of the third amount of electrical power that is re-allotted for use by the first group is determined based on the priority metric associated with the second group.

20. The system of claim 1, further comprising a display device configured to present at least a portion of the first data and at least a portion of the second data.

21. One or more non-transitory computer readable media storing instructions that, when executed by one or more processors, cause the one or more processors to perform operations comprising:
obtaining first data regarding a plurality of groups of electrical devices, wherein each of the groups is disposed in a different respective zone of a facility, and wherein the first data comprises an indication of a budget and, for each of the groups, an indication of a respective priority metric associated with the group;
allotting, based on the first data, a respective amount of electrical power for use by each of the groups;
obtaining second data regarding the groups, wherein the second data comprises, for each of the groups, an indication of a respective amount of electrical power consumed by the group;
determining that a first group of the plurality of groups has consumed a first amount of electrical power, and that the first amount of electrical power is greater than or equal to a second amount of electrical power that had been allotted for use by the first group; and
in response to determining that the first group has consumed the first amount of electrical power, and that the first amount of electrical power is greater than or equal to the second amount of electrical power, re-allotting at least a portion of a third amount of electrical power that had been allotted for use by a second group of the plurality of groups for use by the first group instead.

* * * * *

UNITED STATES PATENT AND TRADEMARK OFFICE
CERTIFICATE OF CORRECTION

PATENT NO. : 11,580,610 B2
APPLICATION NO. : 17/141863
DATED : February 14, 2023
INVENTOR(S) : Adel Abu-Rejailah and Mohammed A. Batouq Page 1 of 1

It is certified that error appears in the above-identified patent and that said Letters Patent is hereby corrected as shown below:

In the Claims

In Column 20, Line 22, Claim 7, please replace "that that" with -- that --.

In Column 21, Line 37, Claim 17, please replace "that that" with -- that --.

In Column 22, Line 5, Claim 19, please replace "method" with -- system --.

Signed and Sealed this
Nineteenth Day of December, 2023

Katherine Kelly Vidal
*Director of the United States Patent and Trademark Office*